March 28, 1961 J. J. SPICER, JR 2,977,432
CONTROL SWITCH
Filed June 22, 1959
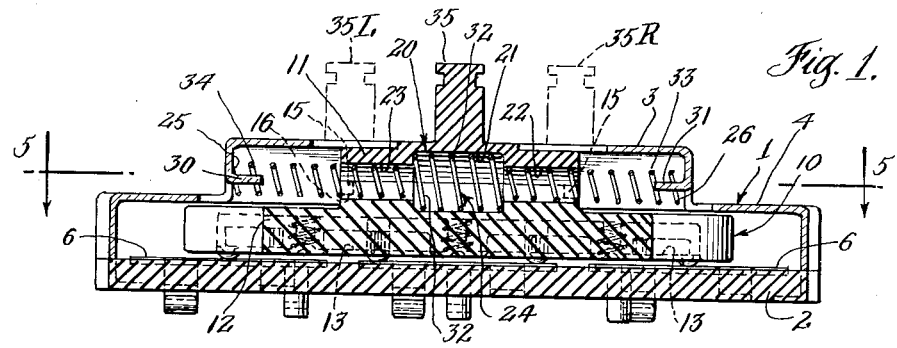
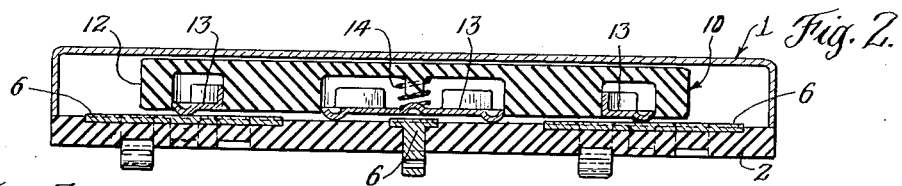
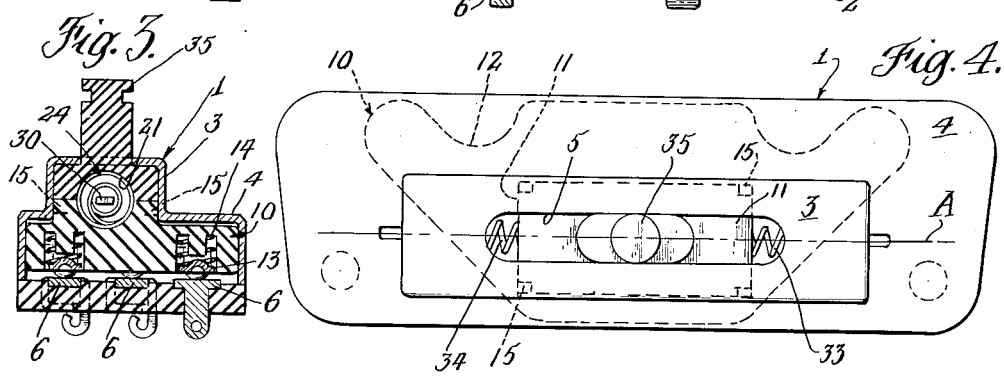
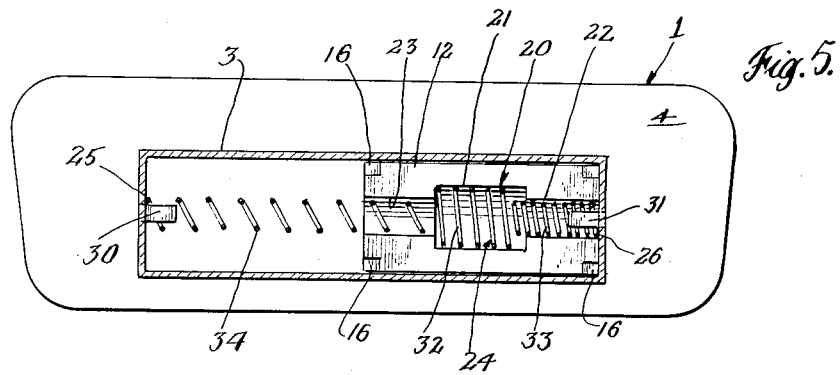
INVENTOR
John J. Spicer Jr.
BY
Synnestvedt & Lechner
ATTORNEYS United States Patent Office 2,977,432
Patented Mar. 28, 1961

2,977,432

CONTROL SWITCH

John J. Spicer, Jr., Philadelphia, Pa., assignor to Novo Industrial Corporation, a corporation of New York Filed June 22, 1959, Ser. No. 821,929

4 Claims. (Cl. 200—16)

This invention relates to control switches and in particular relates to a control switch for a vehicle turn indicating system.

In general, the usual vehicle turn indicating system includes an operator-actuated selector means such as a lever or a button which, through certain mechanical linkage, is adapted to actuate a control switch for the energizing and de-energizing of circuits controlling the flashing of lights to indicate that a turn is to be made in the left or right-hand direction. The selector (and control switch) ordinarily has a neutral position and left and right-hand settable or turn indicating positions with the linkage being arranged so that when the selector is placed in a turn indicating position it is locked until the turn is completed at which time the selector is released and spring means incorporated in the linkage causes the selector and switch to automatically return to the neutral position.

Incorporating the return spring in the mechanical linkage has several disadvantages. For example, such an arrangement requires the holding of very close tolerances on various parts of the switch and also requires a high degree of accuracy in the assembly of the same in order to insure that the control switch is returned to true neutral position. This is not conducive to low manufacturing cost. Another disadvantage of incorporating the return switch in the mechanical linkage is that the arrangement invariably requires or necessitates a larger number of parts in the linkage and does not lend itself to simplicity of design.

In order to avoid the foregoing disadvantages along with others which are well apparent to those skilled in the art, some currently-known switches have endeavored to incorporate the return spring as an integral part of the control spring itself. The present invention contemplates that the return spring be incorporated as a part of the control switch but does this in a manner which results in highly significant advantages and improvements over prior art arrangements, particularly from the standpoint of simplifying design, reducing the number of required parts, considerably advancing the ease with which the switch may be assembled and most important, making positive and sure that the control switch will return to its true neutral position after a turn has been completed.

In one aspect the invention contemplates a control switch having a contact carrier which is movable from a neutral position to either of two turn indicating positions and then automatically returned from a turn indicating position to the neutral position by means of a spring which has a plurality of integral parts, at least one of which is enlarged, the enlarged part being adapted to be engaged by the carrier and compressed when the same is moved to a turn indicating position and the compression force of the spring acting on the carrier to return the same to neutral position after the turn is completed.

In another aspect the invention contemplates a control switch for a vehicle turn indicating system which includes a carrier having a central bore including an enlarged center section together with smaller outboard sections on either side of center and the bore mounting a return spring, the ends of which are engaged with the housing of the control switch and the switch having a large central part disposed in the enlarged bore together with two smaller outboard parts which are at least partially supported within the outboard sections of the carrier, the opposite ends of the outboard parts engaging the switch housing. When the carrier is moved from neutral to a turn indicating position the carrier engages the enlarged part of the spring and then compresses this part along with one of the smaller outboard parts, the force developed by the two compressed parts of the spring operating to return the carrier to a neutral position after the turn is completed.

A preferred construction of the invention will be described in connection with the following drawings wherein:

Figure 1 is a sectional elevational view of a switch constructed in accordance with the present invention and illustrating in particular the disposition of the return spring with respect to the carrier and the housing;

Figure 2 is a sectional elevational view and illustrating in particular certain portions of the housing and the carrier of the switch of Figure 1;

Figure 3 is an elevational cross section of the switch of Figure 1;

Figure 4 is a plan view illustrating the switch of Figure 1 in assembled form;

Figure 5 is a sectional plan view of the switch of Figure 1 with certain parts omitted and illustrating in particular the manner in which the control spring is compressed when the switch is in the right-hand turn indicating position.

In Figure 1 the switch has a housing generally designated by the numeral 1. The housing is preferably made of metal and on the bottom of the housing is secured a base made of insulating material. With reference to Figure 4 it will be noted that the housing 1 is generally elongated in a direction along the axis A and comprises a top 3 and a bottom 4, the top being shorter than the bottom as taken in a direction along the axis A. Also, it will be observed that the top 3 is provided with an elongated slot 5. The insulated base has a plurality of fixed terminals 6 which are adapted to be connected, for example, to various parts of the vehicle turn indicating system.

Within the housing 1 there is a carrier 10 which is comprised of a top 11 and a bottom 12. It will be observed that the top 11 of the carrier fits into the top 3 of the housing and the bottom 12 of the carrier fits into the bottom 4 of the housing. The bottom 12 of the carrier mounts a plurality of bridging connectors, for example, the bridging connectors indicated at 13, these connectors each being urged toward the base 2 to be interengaged with the fixed terminals 6 in accordance with the position of the carrier by means of the springs 14. Typical arrangements of the fixed terminals 6 and the bridging connectors 13 are illustrated, for example, in my Patent No. 2,714,140 and my copending application.

The top and bottom of the carrier are preferably independent parts which are held against relative axial movement (along the axis A) by means of the ears 15 on each end of the top 11 fitting into notches 16 on the bottom 12.

The carrier is provided with a bore 20 which extends generally in the direction of the axis A and is formed partially in the top portion 11 and partially in the bottom portion 12. The bore has enlarged center section 21 and two outboard sections 22 and 23 which are of smaller diameter than the center 21.

Within the bore 20 is a spring 24 the ends 25 and 26 of which respectively engage the opposite edges of the top part 3 of the housing and encircle the tabs 30 and 31. The spring 24 has an enlarged center part 32 which is disposed within the enlarged bore 21 and two outboard parts 33 and 34 which are respectively disposed in the bores 22 and 23.

The top 11 of the carrier has a stud 35 which projects through the elongated slot 5 in the housing and is adapted to be interengaged with the mechanical linkage associated with the switch for moving the carrier from the neutral to the turn indicating position. In Figure 1 the carrier 10 is in the neutral position. When the carrier is moved to, say, the right-hand turn indicating position, the stud 35 is in the position as indicated by the dotted line 35R with the right-hand end of the carrier being in engagement with the right-hand side of the housing. When the carrier is moved to the left-hand turn indicating position, the stud is in the position as indicated by the dotted lines 35L with the left-hand side of the carrier in engagement with the left-hand side of the housing.

As the carrier is moved from the neutral position toward the right-hand turn indicating position, the left-hand edge of the bore 21 being in engagement with the left-hand end of the enlarged center part 32 of the spring begins to compress the same. As the center part 32 begins to compress, the force is transmitted through the outboard part 33, the end of which bears against the housing. As the motion continues, both the center part 32 and the outboard part 33 of the spring are compressed as is indicated in Figure 5.

When the carrier is moved to the left-hand turn indicating position, the right-hand edge of the bore 21 engages the right-hand end of the enlarged part 32 of the spring and begins to compress the same. With continued motion, the outboard part 34 of the spring which is in engagement with the end of the housing also starts to compress. When the carrier has reached the left turn indicating position, the spring is in condition similar to that shown in Figure 5.

When the carrier is in either turn indicating position and then released when the turn is completed, the force built up by the spring will then react on the carrier so as to return the same to the neutral position.

It will be noted, particularly in connection with Figure 5, that as the center part 32 and the outboard part 33 of the spring are compressed, the outboard part 34 expands to compensate for this. Also, it will be observed that the end 25 of outboard part 34 remains in engagement with the housing. This is important from the standpoint of maintaining the spring properly aligned, providing for the return of the carrier to the neutral position without overshoot and so that the return position is always substantially the same. For example, if the carrier is in the position as shown in Figure 5 and then the carrier released so that the spring starts to move the carrier to the neutral position the force of the compressed portions 32 and 33 are releasing their force, whereas a force is tending to build up in the section 34. When the carrier reaches neutral position the two forces tend to balance each other out so that the carrier returns to the desired neutral position without undesired overshoot.

The spring 20 is designed, in conjunction with the bores in the carrier, so that when the spring is assembled the center part 32 is under compression and bears against the ends of the bore 21. Also, the outboard parts 33 and 34 are compressed as they are disposed in the position shown. This makes for a very positive and tight arrangement and is conducive to returning the spring to the desired neutral position.

The switch as above described is very easy to assemble. First of all, the housing is laid upside-down in a jig and then the top 11 of the carrier is inserted so that the stud 35 projects through the slot 5. Then the spring 20 is assembled within the part of the bore provided by the top 11. The bottom 12 of the carrier is assembled with the ears 15 being disposed in the notches 16 which properly locates the two parts of the carrier. Then the springs 14 and bridging connector 13 are inserted. The base 2 is secured to the housing so that the switch is completely assembled.

I claim:

1. For a vehicle turn indicating system, a control switch comprising: a housing; a contact carrier in said housing and mounted for two-way reciprocal sliding motion from a neutral position to either of two turn indicating positions respectively on opposite sides of neutral, the carrier being formed with a bore extending in the direction of said motion, the bore having a central section and two other outboard sections of smaller diameter than the center; and a return spring in said bore to return the carrier from either turn indicating position to neutral position, the spring having a center part disposed in said center section and two outboard parts respectively disposed in said outboard sections, the ends of said outboard parts of the spring engaging said housing and the center part being of a larger diameter than the outboard parts and the ends of the center part of the spring respectively engaging the ends of said center section of the bore.

2. For a vehicle turn indicating system, a control switch comprising: a housing; a contact carrier in said housing and mounted for two-way reciprocal sliding motion from a neutral position to either of two turn indicating positions; and an elongated spring to return the carrier from either turn indicating position to neutral position, the spring being at least partially disposed in said carrier and opposite ends of the spring engaging said housing and free from said contact carrier and the spring having a center part to be compressed, the center part being disposed to be engaged by the carrier for compression thereby when the carrier is moved from neutral to either turn indicating position and the spring having two outboard parts disposed in opposite sides of the center part, one of the outboard parts being compressed while the end of the other outboard part remains in engagement with said housing when the carrier is moved to a turn indicating position and the other outboard part being compressed while the end of said one outboard part remains in engagement with said housing when the carrier is moved to the other turn indicating position, the compression force of the spring in either turn indicating position urging the carrier to the neutral position.

3. For a vehicle turn indicating system, a control switch comprising: a housing; a contact carrier in said housing and mounted for two-way reciprocal sliding motion from a neutral position to either of two turn indicating positions, the carrier being formed with a bore having a plurality of sections, two of which are adjacent one another and one being of larger diameter than the other; and a return spring mounted in said carrier to return the carrier from either turn indicating position to neutral position, the opposite ends of the spring engaging said housing and the spring having a plurality of parts, two of which are adjacent one another and one being of larger diameter than the other, the larger part being disposed in said larger section and the smaller part being disposed in said smaller section, the larger portion being engaged with the carrier and compressed when the same is moved to a turn indicating position and exerting a force on the carrier to urge the same to the neutral position.

4. For a vehicle turn indicating system, a control switch comprising: a housing elongated along an axis and having a top part and a bottom part, the top part being shorter than the bottom part as taken in the direction along said axis and the top part being formed with an elongated slot; a two-portion contact carrier mounted on said housing for two-way reciprocal sliding motion from a neutral position to either of two turn indicating positions respectively on opposite sides of neutral, the carrier having a top portion extending into said top part and a bottom portion extending into said bottom part, the top portion being shorter than the bottom portion taken in the direction along said axis; a bore in said carrier formed partially in said top portion and partially in said bottom portion, the bore having an enlarged center section and two outboard sections; and a spring disposed in said bore, the spring having an enlarged center part in said center section and bearing on the ends of said center section and the spring also having a pair of outboard parts on opposite sides of said center part, the respective ends of the outboard parts being engaged with said housing, the spring being compressed when the carrier is moved to either turn indicating position and exerting a force when in either position to urge the carrier to neutral position.

References Cited in the file of this patent

UNITED STATES PATENTS

| | | |
|---|---|---|
| 2,710,317 | Pearl | June 7, 1955 |
| 2,900,460 | Wallace | Aug. 18, 1959 |
| 2,916,567 | Floam et al. | Dec. 8, 1959 |